United States Patent [19]
Stahl
[11] 4,405,401
[45] Sep. 20, 1983

[54] THERMOPLASTIC LABELING AND METHOD OF MAKING SAME

[76] Inventor: Ted A. Stahl, 37101 Brynford, Mt. Clemens, Mich. 48043

[21] Appl. No.: 283,564

[22] Filed: Jul. 15, 1981

[51] Int. Cl.[3] ........................ B32B 31/00; B65C 9/25; C09J 5/00

[52] U.S. Cl. ........................................ 156/248; 156/267; 156/322; 156/344; 428/914

[58] Field of Search ............... 156/230, 238, 248, 257, 156/289, 344, 267, 268, 271, 273, 298, 322, 249, 254, 257, 240, 584, 234, 324, 309.9; 428/40, 41, 42, 914; 83/881, 346, 887, 347

[56] References Cited

U.S. PATENT DOCUMENTS

| | | | |
|---|---|---|---|
| 3,860,473 | 1/1975 | Wesen | 156/257 |
| 4,153,496 | 5/1979 | Swift | 156/248 |
| 4,246,058 | 1/1981 | Reed | 156/344 |
| 4,306,928 | 12/1981 | Okui | 156/344 |

*Primary Examiner*—William A. Powell
*Assistant Examiner*—Lou Falasco

[57] ABSTRACT

Described is thermoplastic labeling for clothing or the like and a method for making the same. The labeling are strips or rolls of a plurality of thermoplastic adhesive labels lightly adhered to a release paper backing strip.

The labeling is manufactured by kiss cutting strips, rolls, or sheets of thermoplastic film lightly bonded to a carrier backing, using a rotary die—platen combination. By peeling away the waste film, the labels will more clearly stand out as part of the labeling.

2 Claims, 4 Drawing Figures

THERMOPLASTIC LABELING AND METHOD OF MAKING SAME

DESCRIPTION

1. Field of the Invention

The invention is a release paper backing strip to which is lightly adhered a plurality of thermoplastic adhesive labels, and the method for making the same.

2. Background of the Invention

Transfer labels, and especially transfer labels designed for clothing, or clothing-like uses, such as sports uniforms, banners, flags, and the like, were originally stamped out of fabrics such as felt and stitched onto the article of clothing. Subsequently, thermoplastic adhesives were applied to the felt, so that the labels could be applied to the article of clothing and ironed on, the iron providing the heat to cause the thermoplastic adhesive to adhere to the article of clothing. These natural fiber labels were then replaced with plastic labels made of a thermosetting plastic, having a thermoplastic adhesive backing for adhering the label to the article of clothing.

All of these cases are characterized by the fact that each label is produced individually, must be sorted individually, counted and handled individually, all of which substantially contributes to a high labor cost in the total cost for the labels.

I have discovered how the labor intensive nature of the prior art heat transfer labels can be drastically reduced without sacrificing the quality of the product. Further, I have discovered a more convenient way for the user to handle the labels than having individual labels which must be individually stored and handled.

SUMMARY OF THE INVENTION

The invention comprises:

Thermoplastic labeling for clothing or the like comprising, in combination:

a release paper backing strip at least one face of which comprises a release surface;

a thermoplastic film lightly bonded to the release surface of the backing strip and peelable therefrom; and said film comprising a plurality of discrete labels arranged in a series on the strip to be carried thereby as a group and individually peeled therefrom as needed.

The labels or symbols are kiss cut with a die designed to cut entirely through the thermoplastic film adhering to a release paper backing but without cutting through the release paper backing. Preferably, the adhesive film will be lightly adhered to a roll of paper backing, so that by cutting through the film but not the backing, labeling comprised of a strip or roll of separate, discrete labels adherent to a continuous release backing strip is produced. Preferably, the kiss cutting is accomplished with a rotary die machine.

The thermoplastic film is formed by coating the release paper backing with warm or hot thermoplastic, such as by extrusion, knife coating, or the like.

Generally, the labels are formed by placing the paper backed thermoplastic strip against a surface and then kiss cutting the thermoplastic with a die to form a series of labels thereon and then stripping the excess film leaving only the labels on the strip, and then cutting the strip to the desired length.

DESCRIPTION OF PREFERRED EMBODIMENTS

Figure 1:
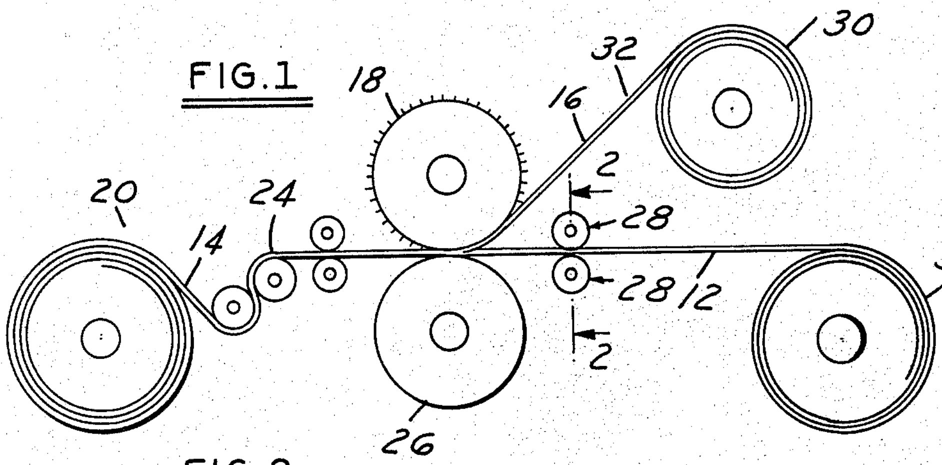
FIG. 1 is a schematic drawing of a kiss cutting apparatus for making the label strips.

The combination comprised of thermoplastic adhesive labels 10 which are separate and distinct, and a carrier 12, such as a release paper backing strip, sheet, and the like 12, to which the labels are lightly adhered constitute labeling 13 which may be formed from feed strip or feed sheet 14 comprised of a thermoplastic adhesive film 16 attached to a release paper backing 12. I have found that the film 16 may be attached to the paper backing 12 without any adhesive, if the film 16 is applied to the paper 12 while hot. Under such application conditions, the film 16 bonds to the paper 12 as it cools, forming a bond having sufficient strength to survive the process of making labeling 13, yet being weak enough to allow labels 10 to be peeled from the paper 12. As a rule, any thermoplastic adhesive which can be heated sufficiently to be extruded or otherwise coated on a paper backing 12 will be suitable.

Generally, once the labels 10 have been removed from the paper backing 12 they cannot be reapplied or applied to any other surface without using heat.

The labels 10 are preferably formed with a die 18, such as a rotary die 18. When a rotary die 18 is used, the die 18 may either create a series of labels 10 with each rotation or only one label 10 with each rotation.

FIG. 1 schematically depicts a side view of an apparatus 20 for manufacturing labeling 13 in strip form 22, which form includes strips, sheets, rolls, and the like. Generally, the feed strip 14 is provided as a roll, sheet, strip, or the like. The label-making apparatus 20 may use a series of wrap rollers 24 for directing the feed strip 14 from feed roll 14 to a platen 26—rotary die 18 combination, a series of nip or take up rollers 28 which keep the feed strip 14 and labeling 13 taut and free from slack, a waste film wind roll 30 for collecting and removing film waste 32 produced in the label-cutting process, and a labeling wind roll 34 for forming rolls of the finished product. Generally, the waste film wind roll 30, the labeling wind roll 34, the die 18, and the take up rollers 28, will have their own means for rotation, which are not shown.

Figure 4:
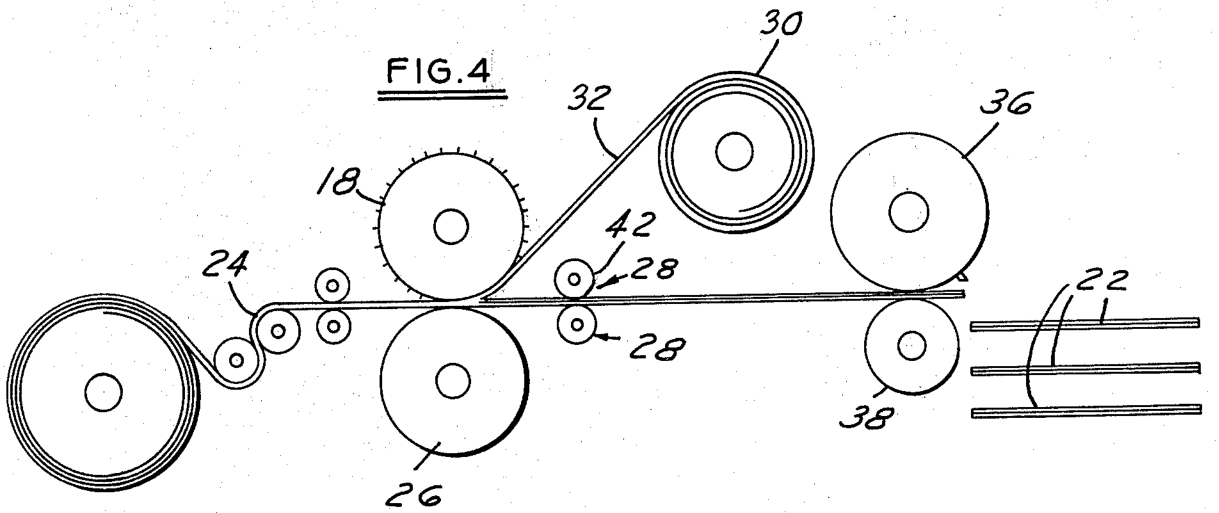
FIG. 4 is a schematic view of a kiss cutting and strip severing apparatus for producing individual strips of labels.

Alternatively, where rolls of labeling 13 are not wanted, shorter labeling strips 22 may be produced, as shown in FIG. 4. In FIG. 4, the labeling wind roll 34 of FIG. 1 is replaced by a rotary cutter 36—cutting platen 20 combination. The rotary cutter 36 may be designed to cut the labeling 13 once or more than once each revolution. With such an apparatus, as shown in FIG. 4, it will be possible to make each strip of labeling 13 carry a complete alphabet, a series of just one symbol, or any other possible combination of symbols such as letters or numbers.

Figure 2:
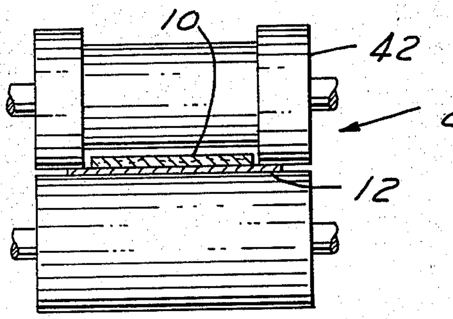
FIG. 2 is a view of the nip rollers of FIG. 1 taken along line 2—2.

FIG. 2 depicts an embodiment of the nip or take up rollers 28, which shows the upper roller 42 being dimensioned to traverse the labeling 13 along its edges on the release surface of the carrier 44, rather than across the face of the symbols themselves. This design helps prevent dirt or grease from becoming imbedded into the label 10 itself. However, such a design is not necessary, and the roller 42 may be designed to contact the labels themselves as the labeling 13 passes through the apparatus 20.

Figure 3:
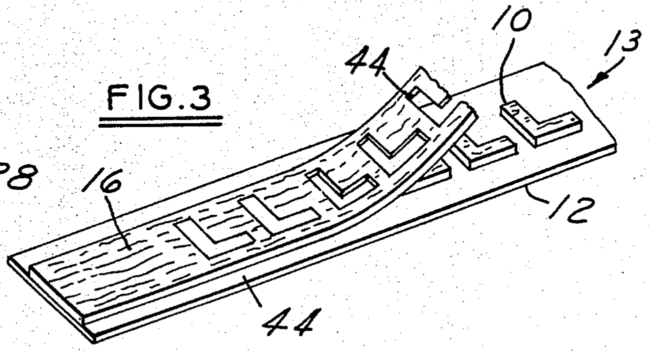
FIG. 3 is a perspective view of a strip of labels with a portion of the waste film being removed.

FIG. 3 shows the waste film 32 produced by the kiss cutting action, as it is being lifted from the paper carrier 12, to provide the finished labeling 13. The labeling 13 contains the finished labels, while the waste film 32 has openings 44 corresponding to the labels 10 on the labeling 13.

In operation, a feed strip roll 14 is placed in the apparatus 20. The end of the roll 14 is then threaded through the wrap rollers 24 and passed to the die 18. The rotation of the die 18 in a counterclockwise direction pulls the sheet from the roll 14, and cuts labels 10 that leave their mark in the film 16 and partly in the backing paper 12. The strip then is forced by this motion to a nip or take up roller 28 which prevents any slack in the system, and from thence onto a labeling wind roll 34 for storage or further processing.

Upon passing through the die 18, the portion of the film 16 that has been cut away by the die forms a waste film 32 which may be automatically or manually threaded upon a waste film wind roll 30. When the entire feed roll 24 has been exhausted, a new feed roll 14 may be inserted. Similarly, when the waste film wind roll 30 is filled, the old waste film wind roll 30 may be removed and a new one inserted. And, when the labeling wind roll 34 has been filled, that roll 34 may be removed and a new one inserted.

Instead of using a wind roll for the labeling, a rotary cutter 36 may be used. The rotary cutter 36 may be designed to cut the labeling 13 into any length desired, limited only by the circumference of the cutter 36 and the length of the labeling 13. Such a cutter 36 allows the labeling 13 to be marketed in convenient sizes.

I claim:

1. The method of producing labels, in the form of symbols, such as numbers, letters and the like, for bonding to clothing or the like, by the application of heat comprising the steps of:

providing a strip comprising a release carrier at least one side of which has a release surface thereon and a thermoplastic film carried by the carrier and lightly bonded by heat to the release surface and peelable therefrom;

kiss cutting the strip to form labels in the film on the carrier by cutting through the film but not through the carrier, whereby labels and waste film material are on the carrier said waste portion being lightly adhered to the release surface and peelable therefrom; and severing the strip at longitudinally spaced intervals forming successive individual label bearing sections each having a length of the carrier with a plurality of the film labels lightly bonded to the release surface and individually peelable therefrom such that each of said labels may be bonded by heat to clothing or the like.

2. The method of claim 1, further comprising the steps of peeling from the carrier backing strip the film that has not been formed into labels.

* * * * *